United States Patent
Guenther et al.

(10) Patent No.: US 6,385,597 B1
(45) Date of Patent: *May 7, 2002

(54) ARRANGEMENT AND METHOD FOR DATA EXCHANGE BETWEEN A POSTAGE METER MACHINE AND CLIP CARDS

(75) Inventors: Stephan Guenther; Ralf Kubatzki, both of Berlin (DE)

(73) Assignee: Francotyp-Postalia AG & Co., Birkenwerder (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/211,339

(22) Filed: Dec. 15, 1998

(30) Foreign Application Priority Data

Dec. 15, 1997 (DE) .......... 197 57 649

(51) Int. Cl.[7] .......... G06F 17/60
(52) U.S. Cl. .......... 705/410; 705/402; 705/60
(58) Field of Search .......... 705/60, 61, 401, 705/402, 410; 235/382, 382.5

(56) References Cited

U.S. PATENT DOCUMENTS

| | | | |
|---|---|---|---|
| 4,746,234 A | | 5/1988 | Harry .......... 400/120.01 |
| 4,802,218 A | | 1/1989 | Wright et al. .......... 705/60 |
| 4,900,904 A | * | 2/1990 | Wright et al. .......... 705/410 |
| 5,490,077 A | | 2/1996 | Freytag .......... 705/405 |
| 5,602,743 A | * | 2/1997 | Freytag .......... 705/408 |
| 5,742,683 A | * | 4/1998 | Lee et al. .......... 705/60 |
| 5,787,406 A | * | 7/1998 | Arsenault et al. .......... 705/410 |
| 5,790,768 A | * | 8/1998 | Windel et al. .......... 358/1.18 |
| 5,809,485 A | * | 9/1998 | Arsenault et al. .......... 705/410 |
| 5,852,813 A | * | 12/1998 | Guenther et al. .......... 705/408 |
| 5,946,671 A | * | 8/1999 | Herring .......... 705/404 |
| 6,111,951 A | * | 8/2000 | Guenther .......... 705/60 |

FOREIGN PATENT DOCUMENTS

| | | |
|---|---|---|
| DE | 195 16 429 | 11/1996 |
| DE | 196 05 015 | 3/1997 |
| EP | 0328059 A2 * | 8/1989 |
| GB | 2215670 A * | 9/1989 |

OTHER PUBLICATIONS

"New Postal Imprinting to Affect SoHo", Managing Office Technology, vol. 42, No. 6, Jun. 1997.*
"Identifizierung Authentifizierung und Autorisierung," Struif, 5.GMD–SmartCard Workshop, Darmstadt Germany (1995), pp. 1–6.

* cited by examiner

Primary Examiner—James P. Trammell
Assistant Examiner—John W. Hayes
(74) Attorney, Agent, or Firm—Schiff Hardin & Waite

(57) ABSTRACT

In an arrangement and a method for data exchange between a postage meter machine and chip cards, a postage meter machine is equipped with a chip card write/read unit and appertaining control system wherein first, corresponding to a succession number a specific insertion sequence for valid chip cards is required in order to reload (update) data, and second, an authorized user is allowed to define a specific sequence for the insertion of lower-ranking, suitably initialized chip cards in order to simplify the function and data entered into the postage meter machine. These latter chip cards set a limited function scope within the postage meter. For their initialization, a table with a specific hierarchic (tree) structure is produced by the user by modifying a pre-stored structure in the postage meter machine. The further chip cards allow access to the table with their chip card number in order to call function applications with limit data that are stored in non-volatile memory areas allocated to the chip card number.

17 Claims, 6 Drawing Sheets

ARRANGEMENT AND METHOD FOR DATA EXCHANGE BETWEEN A POSTAGE METER MACHINE AND CLIP CARDS

BACKGROUND OF THE INVENTION

1. Field of the Invention

The present invention is directed to an arrangement and to a method for data exchange between a postage meter machine and chip cards in a postage meter machine of the type equipped with a chip card write/read unit and an appertaining controller that requires a specific insertion sequence of cards into the chip card write/read unit for valid chip cards in order to reload data.

2. Description of the Prior Art

It is known to keep track of accounting-specific data about cost centers in postage meter machines. The purpose of the cost center concept is to introduce transparency into the accounting of devices that are used by different users. The term "cost center" means a non-volatile memory area provided for department-by-department accounting or booking of usage activity. Each cost center has a number and/or name allocated to it via which the aforementioned memory area is selected. The business entity associated with a cost center is ultimately responsible for the cost (charge) for postage or shipping fees incurred by personnel who use the postage meter machine who are employed by the business entity.

Modern postage meter machines such as, for example, the thermal transfer postage meter machine disclosed by U.S. Pat. No. 4,746,234 utilize fully electronic digital printer devices. It is thus fundamentally possible to print arbitrary texts and special characters in the postage stamp printing area and to print an arbitrary advertising slogan or one allocated to a cost center. For example, the postage meter machine T1000 of Francotyp-Postalia AG & Co. (Postalia, Inc. in the United States) has a microprocessor that is surrounded by a secured housing having an opening for the delivery of a letter. Given delivery of a letter, a mechanical letter sensor (microswitch) communicates a print request signal to the microprocessor. The franking imprint contains a previously entered and stored postal information for dispatching the letter.

It is also known to store data specific to cost centers on chip cards in order to make the user-specific information mobile (portable) and to avoid an intentional misuse of other cost centers. U.S. Pat. No. 5,490,077 discloses a data entry with chip cards for the aforementioned thermal transfer postage meter machine. One of the chip cards loads new data into the postage meter machine, and a set of further chip cards allows a setting of correspondingly stored data to be undertaken by plugging in a chip card. Loading data and setting the postage meter machine are thus possible in an easier and faster manner than via a keyboard input. The keyboard of the postage meter machine remains small and surveyable because no additional keys are required in order to load or set additional functions. A plug-in slot of a chip card write/read unit, in which the respective chip card is to be plugged by the customer within a time window, is located on the back side of the postage meter machine. Due to the lack of direct visual contact, an unpracticed user often does not always succeed in inserting the required chip cards in immediate succession, which then leads to unwanted delays. The postage meter machine only works with relatively expensive chip cards that are themselves equipped with a microprocessor (smart card) and are thus able to check whether the postage meter machine communicates a valid data word to the chip card before an answer is sent to the postage meter machine. When, however, no answer or user identification ensues, this is registered as an error in the postage meter machine and is displayed before a request to remove the chip card is displayed in the display.

A single slot is provided for a number of chip cards that are sequentially inserted.

A table of passwords is stored in the postage meter machine in order to automatically enter passwords into the chip card. The inserted chip card checks whether the postage meter machine belongs to the group of authorized users by comparing the passwords to an internally stored password. Auxiliary functions, special functions and information from the chip card can be used with temporarily valid passwords that are communicated on demand to the user when the payment is assured. After processing the command sequence according to the transfer protocol, which includes further commands for switching into a security mode of the chip card and for manual password entry into the chip card, the protected chip card data can be fetched. A disadvantage is that the user must pay attention to the proper sequence when inserting a number of chip cards. The fee schedule reloading card must be inserted first. Even with the successor cards, the selection of the chip card to be inserted is up to the user. As is known, a PIN or password input is demanded for assuring the authenticity in different security levels. A disadvantage, however, is that such a number of passwords, may have a time limit on their validity. The alternative of manual PIN or password entry for a number of cards could lead to undesirable confusion.

German OS 196 05 015 discloses an embodiment for a printer device (JetMail®) that, given a non-horizontal, approximately vertical letter transport, implements a franking imprint with an ink jet print head stationarily arranged in a recess behind a guide plate. For recognizing the start (leading edge) of a letter, a print sensor is arranged shortly before the recess for the ink jet print head and collaborates with an incremental sensor. The letter transport is free of slippage due to pressure elements arranged on the conveyor belt, and the incremental sensor signal derived during the transport has a positive influence on the quality of the print image. Given such a postage meter machine exhibiting larger dimensions, however, a chip card write/read unit would have to be arranged and operated such that sequentially pluggable chip cards can be unproblematically used. Since the memory capacity on a chip card is limited, the user must keep a number of chip cards on hand, and the postage meter machine must be configured to store all loaded data.

As an alternate way for solving the further problem that there is only limited memory capacity available on a chip card, U.S. Pat. No. 4,802,218 discloses that a number of chip cards be simultaneously employed, these being plugged into a number of write/read units. In addition to a user chip card for the recrediting and debiting whereby the postage fee value is subtracted from the credit, a master card and a further rate chip card with a stored postage fee table are simultaneously plugged in. By accessing a postage fee table, a postage fee value can be determined according to the input weight and shipping destination without loading an entire table into the machine. Since, however, a respective write/read unit is required for every chip card, the apparatus becomes too large and expensive. Moreover, a separate reloading terminal is required in order to replenish the credit in the user chip card, with the master card providing the authorization for this reloading function. A supervisor card has access to all master cards. Various security levels are accessible by appertaining key codes. Such a system with a number of slots for chip cards is very complex overall.

German OS 195 16 429 discloses a method for an access authorization to a secured machine or circuit with card-like master elements that make card-like authorization elements perceptible as valid. Such card-like authorization elements that have been validated later allow access to the secured machine or circuit without the user having the master element in his or her possession. Further authorization elements also can be confirmed as valid. The authorization procedure includes an information exchange between a higher-ranking master element and a lower-ranking authorization element or master element, and an electronic lock of the secured machine or circuit. Specific customer wishes, however, can not be taken into consideration because all cards generated in this way are technologically and functionally identical and merely serve the purpose of distributing access authorizations of a hierarchically ordered administration of the secured machine or circuit. The use of a chip card for access authorization in different hierarchy levels as well is known, but must be accompanied by a further data entry by keyboard by the user in order to call or set an application.

The chip cards are usually initialized by the chip card manufacturer and the postage meter machine manufacturer. It is somewhat complicated, however, for the postage meter machine manufacturer to take specific customer wishes into consideration. There is the necessity for the user of the postage meter machine to inform the manufacturer of his customer wishes that relate to a specific input function by chip card. Until the user has been sent an correspondingly initialized chip card, the postage meter machine can continue to be set for the specific input function only via the postage meter machine keyboard.

SUMMARY OF THE INVENTION

An object of the present invention is to provide an arrangement and a method for data exchange between a postage meter machine and chip cards, wherein the sequence of chip cards to be sequentially inserted is partly defined by the manufacturer and partly by the user. Given access to protected memory areas of the chip card, an adapted security should be achieved given the highest possible user friendliness and with low cost. The protection of the transmitted data against a manipulation should be assured.

This object is achieved in a method wherein a first processor chip card is utilized that, at the same time, represents a general access authorization to the postage meter machine and offers a reloading possibility into the postage meter machine. The first processor chip card contains a sequence number stored in a protected manner that has a relationship to a sequence number of a further chip card.

The further chip cards can either supplement information stored in the postage meter machine, or modify it in a suitable way, and/or offer an unlimited access to the functions of the postage meter machine.

The postage meter machine is equipped with a chip card write/read unit and an appertaining controller. The controller requires a specific insertion sequence for valid chip cards into the chip card write/read unit in order to reload data, but allows an authorized user to define a specific sequence for the insertion of further suitably initialized, lower ranking chip cards in order to simplify the function and data entry into the postage meter machine. The latter chip cards set the postage meter machine to an operation with limited function scope. For their initialization, a table with a specific hierarchic structure is produced using of the keyboard and display and with the assistance of a microprocessor and the appertaining non-volatile memories in memory areas within the postage meter machine, so that the pre-stored structure is correspondingly modified by the user. As used herein, "initialization" means the completion of a chip card number, the writing in a part of an identifier string in a memory of the chip card, and the allocation and storing of the allocation of the chip card number to a number of one or more application functions in a non-volatile memory of the postage meter machine. As used below, "top down initialization" means the derivation of chip card numbers and their allocation in the postage meter machine to a limited number of application functions or to at least one application function.

A tree structure thereby arises in the hierarchy for the second chip cards derived from the inventive first chip card and for further successor cards, particularly specific application cards that allow the access to the table with their chip card number stored internally in the chip card. The allocation of a chip card number to function applications with limit data can be arbitrarily selectably stored in the memory areas by the authorized user.

In an economical and customer-friendly way, the arrangement for data exchange between the postage meter machine and chip cards enables a large variety of data to be loaded into the postage meter machine or selected. When, thus, there is a need to modify data stored in the postage meter machine dependent on unforeseeable external events, i.e. to implement a data update, then the control system of postage meter machine loads the data—given validity—from unprotected memory areas and then from protected memory areas of the chip and operates then in a suitable way with data from other chip cards that were previously loaded.

The chip card write/read unit operates according to different communication protocols dependent on the respective card type of the inserted card and loads data from inserted, valid chip cards under the control of the control system of the postage meter machine. The control system is equipped with a program memory and a microprocessor in order, according to an application program, to store, the data currently received from the chip card write/read unit in corresponding non-volatile memory areas and to link this stored data in a suitable way with the memory areas that already contain previously loaded data from previously inserted, valid chip cards.

The chip card reader of the postage meter machine includes a contacting unit for the mechanical acceptance and electrical connection of the chip card as well as an appertaining microprocessor board that functions as a link element between the postage meter machine and an inserted chip card in order to enable the communication and/or the data transfer. The interface of the chip card reader is a serial interface according to the RS232 standard; the software protocol can vary so as to be manufacturer-specific. The chip card reader is integrated into the base housing of the postage meter machine.

A reload (update) possibility is thus created for at least the data of a function feature and/or the postage table data in that a dialog with the inserted chip card via a single chip card write/read unit, whereby a loading of data with respect to new features and/or with respect to a postage fee table ensues from a first chip card, coupled with a first code that modifies an allocation of features/data stored in the postage meter machine to a second code that is entered.

An access possibility to at least one defined cost center or to data of a function feature can also be automatically entered with a chip card. An automatic access authorization at least to the overall cost center is thereby checked. If not differently declared, all issued chip cards will access only this cost center, but the possibility is permitted of subsequently making a manual selection of a specific department-related cost center for the cost center memory of the postage meter machine via the keyboard. It can also be declared that a second or further successor chip cards of an arbitrary type access defined cost centers. This is achieved, given an inserted master chip card, by producing a table having a specific hierarchic structure in memory areas within the postage meter machine.

The invention is based on the concept of allowing different security measures in different security levels in order to achieve an adapted security. The authorized access to the chip card data can be checked within the chip card itself. The postage meter machine communicates its serial number to the chip card, which implements a comparison of the communicated serial number to a stored serial number and communicates the result of the comparison to the chip card write/read unit. Given a positive comparison result, the latter receives a dataset with numbers, prescribed data and reload data as well as an appertaining authorization code MAC. The controller of the postage meter machine checks the authorization of the loaded data on the basis of the communicated authorization code MAC. For the reloading of data, a manufacturer-defined sequence for the insertion of the reload chip cards is protected by a sequence number communicated in addition to the base number.

Moreover, the controller is equipped with a program, so that the user, particularly the postage meter machine user, can program a security protection into the postage meter machine which is individually adapted according to a hierarchic principle.

The entire cost center handling within the postage meter machine is inventively controlled with the assistance of a consecutive chip card number in every chip card that is employed in combination with the postage meter machine. A first application that allocates specific privileges (hierarchies), security measures and cost center numbers to specific chip card numbers is stored within the program memory of the postage meter machine. The first chip card, which is supplied together with the postage meter machine, is referred to as a master card. The authorization is not limited for this card. In addition to the consecutive number, however, the master card contains further data in its protected, non-volatile memory areas. The method for data exchange inventively provides that this further data is communicated in separate datasets. This further data include a sequence number for the continuation of the reloading with a further reload (update) chip card and, in particular, boundary data or limit data limiting the application authorization of successor cards that effect a limitation of any operation which is not set and triggered by the master card. These boundary or limit data achieve an application-adapted security protection for a second chip card or for the further successor cards. The hierarchically highest-ranking, first chip card causes a limit account to be stored in a protected memory area of the non-volatile memory of the postage meter machine. This principle is continued downward in the hierarchy for successor cards. The hierarchically higher-ranking, second chip card thus deposits a limit account in a protected memory area of a non-volatile memory of the postage meter machine for a lower-ranking successor card. The aforementioned table can be at least partially displayed according to the modified structure (for survey by the user) before storage ensues. A limit account prescribed by the master card can only be modified in one direction, i.e. can only be more restrictively limited. The aforementioned limit thus can not be cancelled by a chip card having a lower rank.

A set of chip cards that control the access to preselectable postage meter machine functions for the combined application thereof is made available to the user. Moreover, an easily accessible chip card write/read unit is created in the postage meter machine, that is arranged behind the guide plate, that avoids problems plug-in of cards. Mistakes in the selection of a chip card are also minimized by the easy access to the chip card write/read unit. The chip card/postage meter machine system can be arbitrarily expanded or user-modified. A different inserted chip card type can be recognized by the postage meter machine and correspondingly interpreted. The postage meter machine thus can be operated with an optimally inexpensive chip card type. The advantages of unambiguous, simple and fraud-resistant cost center selection by chip card are still achieved while avoiding the use of substantial memory capacity. In addition to enabling the cost center, an enabling of predetermined, further functions can be achieved merely by plugging a chip card into the chip card write/read unit. Functions and/or data allocated to this chip card number are stored in the table. The table is stored in corresponding memory areas of the non-volatile memory of the postage meter machine. The aforementioned table has a specific hierarchic and modifiable structure in which limit data are stored allocated. The aforementioned, modifiable structure is divided into a list of valid card numbers, linkage conditions and appertaining parameter sets. Every second and following chip card need contain only a chip card number. The postage meter machine reserves a memory location for a parameter value for at least one type of limit value. This allows an inexpensive set of chip cards to be used that are only partially pre-initialized at the manufacturer. The desired chip card number can be additionally stored or modified in a third part of an identifier string in the memory areas of the chip card by an authorized user with the chip card write/read unit of the postage meter machine. A control device of the postage meter machine connected to the chip card write/read unit has a non-volatile memory with memory areas for an allocation of listed application functions to limit data and to a chip card. The microprocessor of the control device of the postage meter machine is programmed to load the chip card number stored in the respective chip card, to call an allocation of the listed application functions to the respective chip card number in one of the memory areas of the non-volatile memory of the postage meter machine and to implement the corresponding application programs stored in the program memory while adhering to the limit value. The allocation in the aforementioned memory areas can be arbitrarily selected by the authorized user and stored in the aforementioned memory areas within the scope of the limit values.

The distributed, modifiable structure can be restored using electronic pointers in order to undertake a corresponding data entry into the main memory, to allow whereby the microprocessor of the postage meter machine to execute corresponding function or a stored sequence of functions according to the application program. One of the functions can be implemented in order to at least partially display the structure in a table or in order to allow the user to modify this structure or table.

DESCRIPTION OF THE PREFERRED EMBODIMENTS

Chip cards are available in various types such as mere memory cards, intelligent ("smart") memory cards, processor chip card and multi-functional chip cards. The application possibilities are maximized only given the latter type, but this is at the expense of a higher chip price.

Figure 1A:
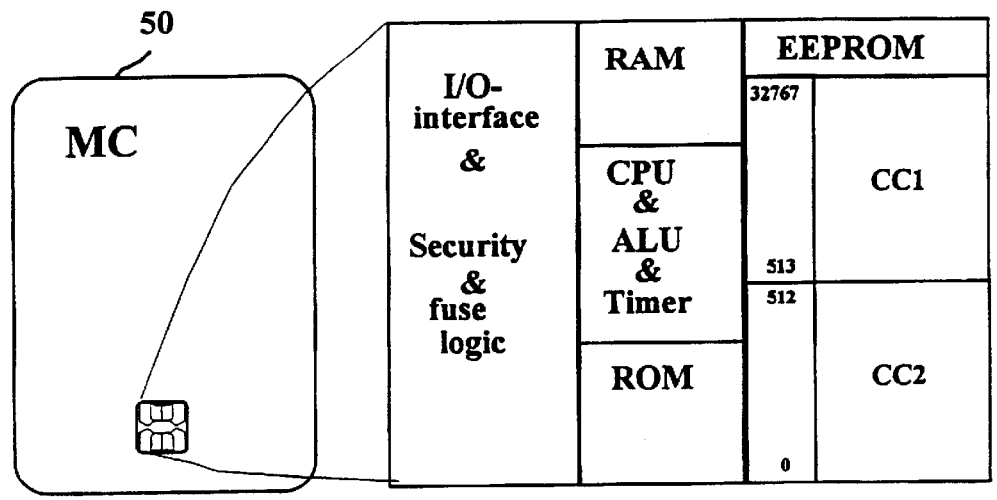
FIG. 1a illustrates the arrangement of the memory areas and further components of the circuit in the chip of a processor chip card in accordance with the invention.

FIG. 1a shows an arrangement of the memory areas and further components of the circuit in the chip of a processor chip card suitable for use in accordance with the invention. A processor chip card has an I/O interface circuit, a security and fuse logic and a non-volatile write/read memory EEPROM integrated on the common chip as well as a read-only memory ROM with a program and a processor CPU for processing the program and a main memory RAM. The processor chip card enables an authentification and thus expands the application possibilities.

As is known, the memories are located under the contact field of the chip, the memory areas thereof being divided into unprotected and protected areas. Other data generated by the postage meter machine and chip card manufacturer are stored in both areas. Together with the non-volatile write/read memory EEPROM, the unprotected memory area CC1 and protected memory area CC2, a read-only memory ROM for a general memory area is also provided on the common chip.

A PIN check is implemented with the microprocessor before security-relevant data in the protected memory area CC2 are accessed. A chip card number in the identifier string is partially stored in the ROM and/or in the protected memory area CC2 as well as in the unprotected memory area CC1. The part of the chip card number in the unprotected memory area CC1 can be modified by a higher, security-cleared, authority. Security-relevant data that represent limit data in terms of time, piece count or value or contain functions that effect a limitation of an operation are stored in the protected memory area CC2 of a first chip card together with the one part of the chip card number.

The authorization of successor cards with a first chip card (master card), for example, can be valid with a time limitation when corresponding, stored security-relevant data are loaded into a postage meter machine and are non-volatilely stored therein as a condition for an authorized successor card.

The data in the protected area have been generated in various ways. A first part of an identifier string can be written only by the chip manufacturer in the read-only memory ROM. A second part of the identifier string can only be written by the postage meter machine manufacturer in the protected non-volatile EEPROM area. A protected data area in the third part of the identifier string that can be modified by the customer is provided in the unprotected data area given further chip cards or successor chip cards. This part is written by the postage meter machine manufacturer for master cards. The third part of the identifier string can be modified by the customer in the following way given further cards and successor cards. The user accesses this area according to a predetermined, preferably menu-controlled input via the postage meter machine keyboard. The aforementioned access is only possible for the authorized user. The latter, for example, has a processor chip card that has a higher rank in the hierarchy than the chip card to be initialized.

Figure 1B:
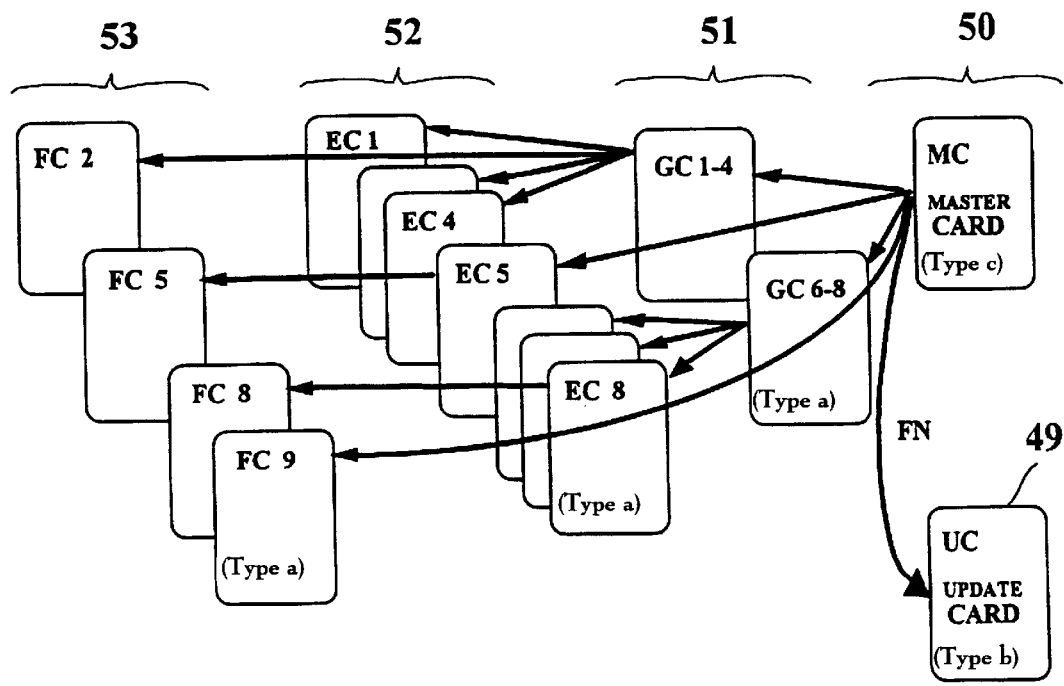
FIG. 1b illustrates the tree structure of the hierarchy for the function application cards derived from the master chip card in accordance with the invention.

A hierarchic structure that—as shown in FIG. 1b—can be arbitrarily expanded and modified by the postage meter machine user proceeding from a first chip card, is produced for a group of chip cards by the internal postage meter machine initialization with of an allocation to application functions in the postage meter machine and with a user-authorized writing (entry) in the third part of the identifier string in the memory chip of the chip card. The first chip card 50 is at the highest hierarchy level and is the personalized master card. The second chip cards referenced 51 in the group are at the first hierarchy level, the further chip cards referenced 52 in the group are at the second hierarchy level, the following chip cards referenced 53 in the group are at the third hierarchy level, etc. The cards from these groups of chip cards for which the function application authorization is stored level-by-level limited in selectable fashion and tabularly are also referred to as successor cards. The first card MC is thus the master card (hierarchy 0) with which all initializations and modifications can be undertaken. For example, another five cards with the consecutive numbers 002 through 006 respectively for four of the cost centers exist in the first branch. The second card 51 is authorized for the access to the cost centers 1 through 4 as group card GC 1–4 (hierarchy 1). The further successor cards 52 are respectively authorized for only a single cost center as individual card EC 1, EC 3, EC 4 (hierarchy 2). The second card 51 can allow modifications in the successor cards 52, i.e. in the individual cards EC 1, EC 3, EC 4, in the scope of its own authorization. The modification of the cost center, namely KST number 1, 3 and 4, that is undertaken relates to a change in the allocation of application functions. Such a modification can be undertaken (top down) with the assistance of the group card (51) GC 1–4 but not (bottom up) for the first card 50 MC. The franked postage value can be booked onto one of the cost centers, namely the cost center numbers 1 through 4, with the group card (51) GC 1–4. An individual function card FC 2 initialized internally in the postage meter machine with the group card GC 1–4 then only allows its possessor to undertake an informational inquiry of the bookings under the cost center number 2 and only zero-value frankings with the postage meter machine.

Without generating a group card, it is also provided in a second branch to generate an individual card EC 5 and a function card FC 5, both of which are allocated to the fifth cost center. An individual function card FC 5, initialized internally in the postage meter machine with the individual card EC 5, only allows its possessor, for example, to undertake an informational inquiry of the bookings under the cost center number 5 and zero-value frankings with the postage meter machine. Without further hierarchy levels, only a successor card FC 9 allocated to a lowest hierarchy level can be internally initialized in the postage meter machine. The cards of the lowest hierarchy level are the most limited in function application scope.

Without omitting hierarchy levels, a number of successor cards allocated to each hierarchy level can likewise be internally initialized level-by-level in the postage meter machine in a third branch, i.e. a group card GC 6–8 as successor card 51 in the first hierarchy level, an individual card EC 8 as successor card 52 in the second hierarchy level and a function card FC 8 as successor card 53 in the third hierarchy level. The successor cards in the first through third group 51, 52, 53 (hierarchy level) can be of a different, more inexpensive type than the master chip card. The successor cards are preferably type a and the master chip card is preferably type c.

A sequence number FN is also stored in the protected, non-volatile memory area of the processor chip card, this sequence number FN referencing a further reload chip card 49 with which the reloading can be continued or modified. The manufacturer writes this further reload chip card with reload (update) data and with a further sequence number that references a following, further reload chip card that the manufacturer possibly may only supply in the future. Whereas the processor chip card 50 is of a type c, the further reload chip cards 49 can be of the same type or of some other type, preferably type b.

The protection of the cards against readout of the consecutive number is possible in a known way by PIN or other security algorithms. Given loss of the master card, a replacement is only possible from the postage meter machine manufacturer (and corresponding documentation of the authenticity). The inhibiting or enabling of all other cards is possible with the master card. A further security measure in the internal postage meter machine initialization of the system with the assistance of the master card is achieved because only physically present cards can be initialized; as a result, the secret, consecutive numbers of the cards are protected. An inhibiting of the corresponding memory area of the postage meter machine can ensue when a successor card is lost.

Figure 2:
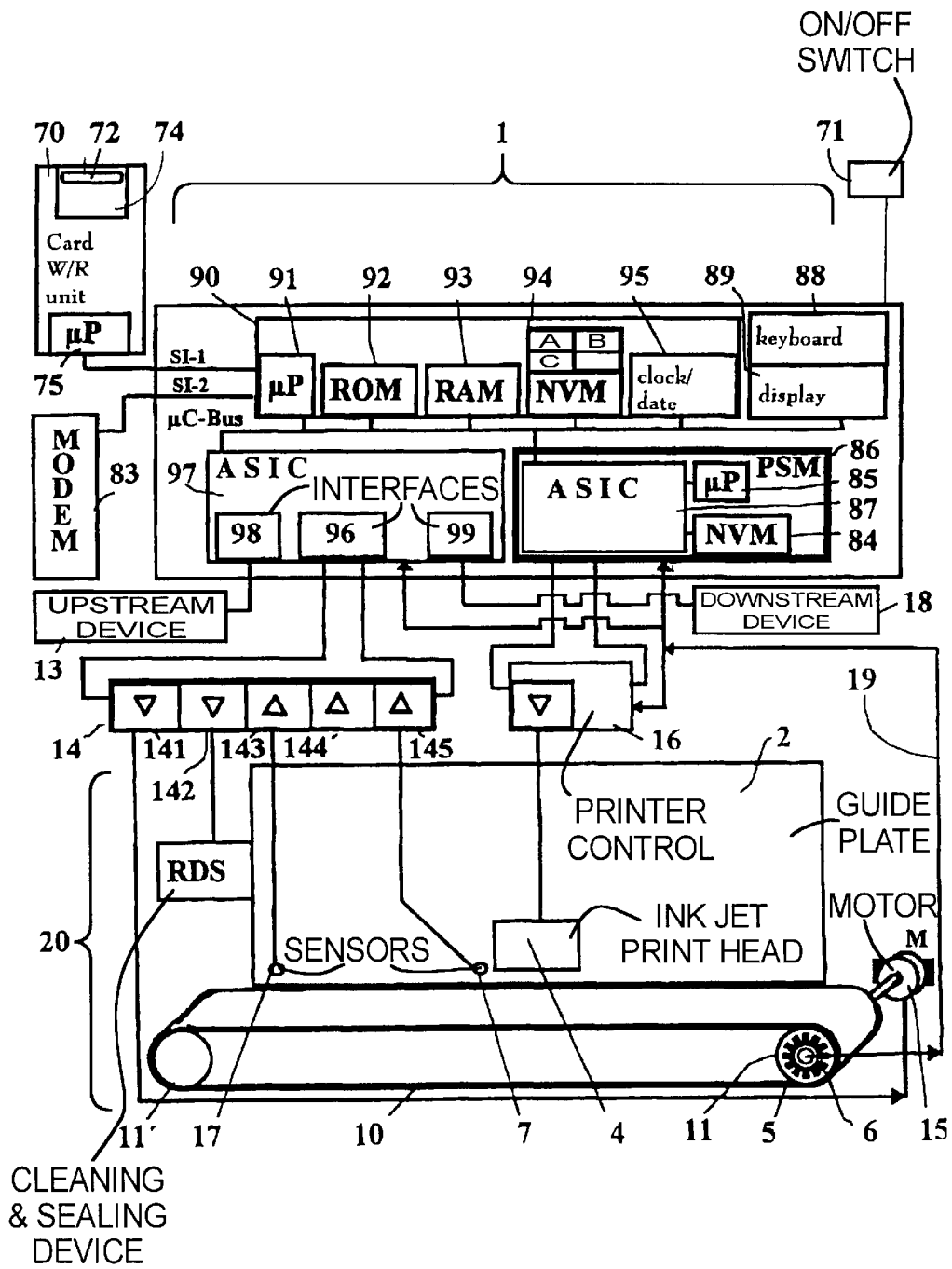
FIG. 2 is a block diagram for setting the function of the postage meter machine and for driving the printer means in accordance with the invention.

FIG. 2 shows a block circuit diagram for setting the function of the postage meter machine and for driving the printer 20 with a chip card write/read unit 70 and with a control system 1 of the postage meter machine. The control means 1 forms the actual meter and includes a first control device 90, a keyboard 88 and a display unit 89 as well as a first and a second application-specific circuits (ASIC) 87 and 97. The first control device 90 contains a first microprocessor 91 and known memories 92, 93, 94 as well as a clock/date circuit 95. Areas for storing accounting data that are allocated to the cost centers are provided in the non-volatile memory 94.

Together with a second microprocessor 85 and a non-volatile memory 84, the first ASIC 87 forms a postal security module PSM 86. The postal security module PSM 86 is enclosed in a physically secured housing and has a fast serial interface to the printer control 16. A hardware-based debiting in the first ASIC 87 ensues before every franking imprint. The debiting ensues independently of cost centers. The second microprocessor 85 contains an integrated read-only memory int.ROM (not shown) with the specific application program that is approved for the postage meter machine by the postal authority, or the respective mail carrier. The postal security module PSM 86 can be implemented as disclosed in greater detail in European Application 789 333.

Both ASICs 87 and 97 are connected via the parallel μC bus to at least the control device 90 and the display unit 89. The first microprocessor 91 preferably has terminals for the keyboard 88, a serial interface SI-1 for the connection of the chip card write/read unit 70 and a serial interface SI-2 for the optional connection of a modem. The credit stored in the non-volatile memory 84 of the postal security module PSM 86 can be increased with the modem.

The second ASIC 97 has a serial interface circuit 98 to a preceding device 13 in the mail stream, a serial interface circuit 96 to the printer device 20 and a serial interface circuit 99 to a device 18 following the printer device 20 in the mail stream.

A suitable peripheral device embodying such interfaces is described in German Application 197 11 997.2 (as yet unpublished), corresponding to pending U.S. application Ser. No. 09/041,469 filed Mar. 12, 1998 ("Arrangement for Communication Between Stations of a Mail Processing Machine," Kunde et al.) assigned to the same assignee as the present application.

The interface circuit 96 coupled with the interface circuit 14 located in the machine base produces at least one connection to the sensors 6, 7, 17 and to the actuators, for example to the drive motor 15 for the drum 11 and to a cleaning and sealing station RDS for the ink jet print head 4, as well as to the ink jet print head 4 of the machine base. The fundamental arrangement and the interaction between ink jet print head and the RDS Further details of the interaction between the print head 4 and the cleaning and sealing station RDS are disclosed in German Application 197 26 642.8 (not yet published, corresponding to pending U.S. application Ser. No. 09/099,473, filed Jun. 18, 1998 ("Device for Positioning an Ink Jet Print Head and a Cleaning and Sealing Device," von Inten et al.) assigned to the same assignee as the present application.

One of the sensors 7, 17 arranged in the guide plate 2 is the sensor 17 and serves the purpose of preparing the print initiation during letter transport. The sensor 7 serves for recognizing the start of the letter for the purpose of print initiation during letter transport. The conveyor arrangement is composed of a conveyor belt 10 and two rollers 11, 11'. One of the rollers is the drive roller 11, connected to the a motor 15, another is the entrained tension roller 11'. The drive roller 11 is preferably a toothed roller; accordingly, the conveyor belt 10 is a toothed belt, assuring a positive force transmission. An encoder is coupled to one of the rollers 11, 11'. The drive roller 11 together with an incremental sensor 5 is preferably firmly seated on a shaft. The incremental sensor 5 is implemented, for example, as a slotted disk that interacts with a light barrier 6, forming the encoder.

The individual print elements of the print head 4 are connected within its housing to print head electronics, and the print head can be driven for a purely electronic printing. The print control ensues on the basis of the path control, with the selected stamp offset being taken into consideration, this being entered by keyboard 88 or, as needed, by a chip card and being non-volatilely stored in the memory NVM 94. A planned imprint thus derives from the stamp offset (without printing), the franking imprint image and, possibly, further print images for advertising slogan, dispatching information (selective imprints) and additional, editable messages.

Figure 3:
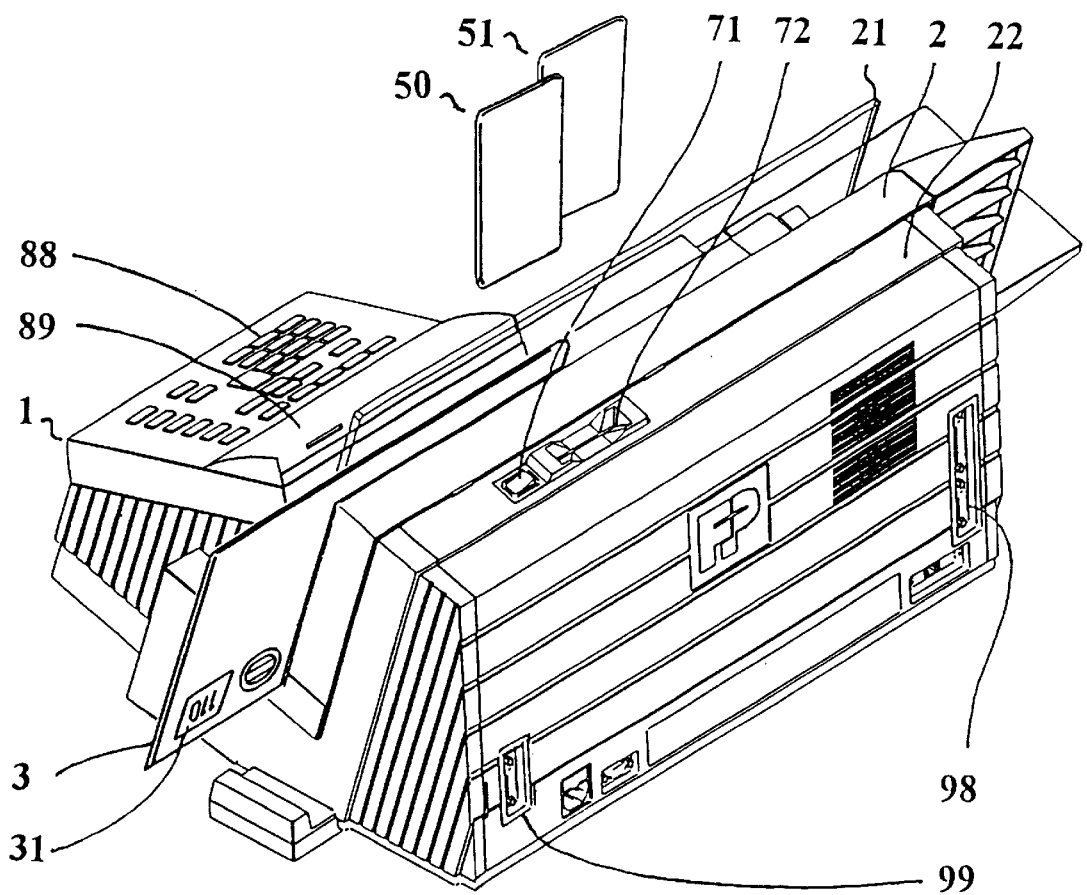
FIG. 3 is a perspective view of the postage meter machine in accordance with the invention from behind.

FIG. 3 shows a perspective view of the postage meter machine from behind. The postage meter machine is equipped with a chip card write/read unit 70 that is arranged behind the guide plate 2 and is accessible from the upper housing edge 22. After the postage meter machine is turned on with the switch 71, a chip card 50 is plugged from top to bottom into the insertion slot 72 and can be programmed by the user for specific applications. Within the limits prescribed by the manufacturers, this ensues with the user interface 88, 89 of the control system 1 of the meter. The successor cards are configured by the user for predetermined function applications for the respective postage meter machine. The peripheral devices of the postage meter machine can be electrically connected to the interfaces 98 and 99 and thus can be driven by the meter according to the chip card input. A letter 3 supplied standing on edge that has its surface to be printed lying against the guide plate is then printed with a franking stamp 31 according to the input data. The letter delivery opening is laterally limited by a transparent plate 21 and the guide plate 2.

A predetermined cost center is set with the insertion of a first chip card 50 that was supplied together with the postage meter machine. For example, the cost center 1 is pre-set, the accounting ensuing with respect thereto in order to gain access to other cost centers when no other predetermined inputs are actuated by keyboard.

The postage meter machine contains a corresponding application program in its program memory 92, so that a first chip card 50 plugged into the chip card write/read unit 70 allows a setting of the postage meter machine for at least one function application on the highest hierarchy level.

In accordance with the invention the control system 1 has a control device 90 equipped with a microprocessor 91 with appertaining memories 92, 93, 94, 95 and a connected user interface 88, 89 that, dependent on a predetermined input, allows the user to undertake an internal postage meter machine initialization of at least one chip card from a number of further chip cards 51, 52, 53 subsequently inserted into the plug-in slot 72, with the microprocessor 91 of the postage meter machine being programmed to write data into a part of the identifier string of a chip card in order to at least supplement the chip card number. In conjunction with suitably inserted chip cards, the function input and the calling of the application function, for example the administration of cost center data to be entered are simplified. The further chip cards 51, 52, 53 are sequentially inserted into the plug-in slot 72 of the chip card write/read unit 70 and are internally initialized in the postage meter machine, with a table having a specific hierarchic structure being produced using the keyboard 88 and display 89 and with the assistance of the microprocessor 91 and the appertaining non-volatile memory within the postage meter machine. The pre-stored structure is correspondingly modified and stored in one of the appertaining non-volatile memories 94, 95 allocated to a respective chip card number, with the chip card number being stored in a segment provided therefor in an identifier string stored in the protected areas of the further chip cards 51, 52, 53.

A successor chip card is referenced type c below and works according to ISO7816, T1 protocol. For example, the main memory is a 256 byte RAM, the processor an 8 bit CPU, the non-volatile memory a 16 Kbyte EEPROM and the read-only memory a 16 Kbyte ROM. A processor chip card of the Orga company can be employed as the multi-function chip card 50 and master card.

Another chip card having significant memory capacity is referred to below as type b. For example, an I²CBus memory card having 32 Kbytes according to ISO 7816, particularly AM2C256 of the AMMI company, can be employed. This contains a chip AT24C256 of the Atmel company.

Further chip cards are referred to below as type n. For example, a chip card with 8 Kbytes and having a microprocessor can be employed. The further chip cards of the types b through n relate, for example, to the following function applications:

reload possibility of the postage fee tables via chip card 49,
slogan reloading via chip cards (daily stamp),
chip cards with limited function application,
chip cards with PIN authorization of functions,
chip cards for setting peripheral device function,
chip cards for setting system configuration,
chip cards for the activation of programmed print formats.

Figure 4A:
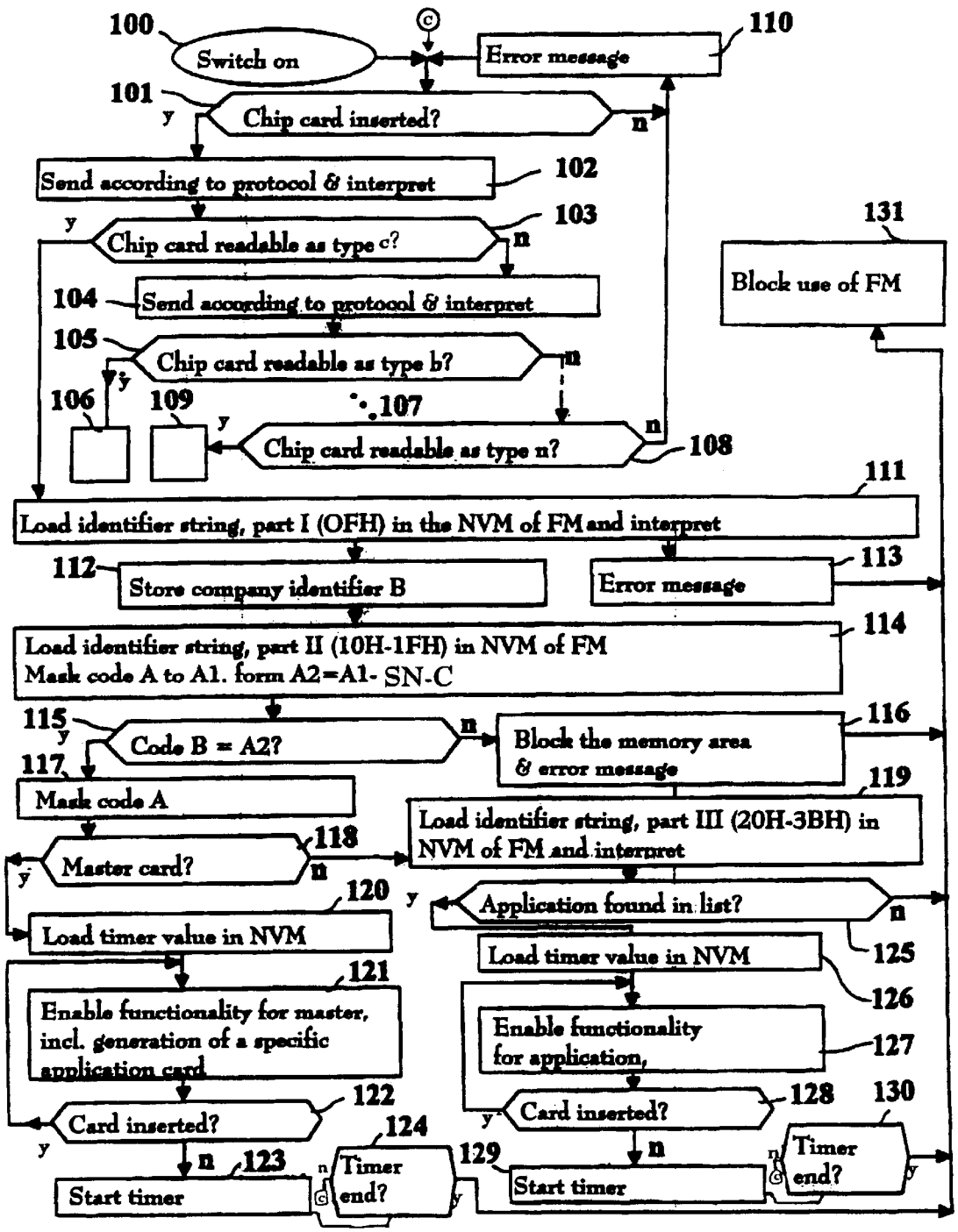
FIG. 4a is a flowchart for control by the microprocessor given data input with a chip card in accordance with the invention.

FIG. 4a shows a flowchart for control by the microprocessor of the postage meter machine in the data input with a chip card. After a power supply (not shown) of the postage meter machine is turned on with the switch 71, which is registered by the microprocessor 91 of the postage meter machine in the step 100, a microprocessor 75 connected to a contacting arrangement 74 of the chip card write/read unit 70 signals the microprocessor 91 of the postage meter machine when a chip card is inserted into the plug-in slot 72, which is registered by the microprocessor 91 of the postage meter machine in the step 101. A communication according to a predetermined protocol between the chip card write/read unit 70 and the chip card and an evaluation in step 102 then ensues as to determine whether the chip card is readable as type a. When this is the case, a branch is made from the inquiry step 103 to a step 111 in order to load a part I of the identifier string into the non-volatile memory 94 of the postage meter machine, with an evaluation of the company identification number (company ID) being undertaken by the microprocessor 91 of the postage meter machine. If, however, the chip card is not readable as type a, a branch is made from the inquiry step 103 to a step 104 in order to undertake a communication according to a second predetermined protocol and an evaluation in step 104 as to whether the chip card is readable as type b. When the chip card is readable as type b, a branch is made from the inquiry step 105 to a step 106 for further data processing with the microprocessor 91 of the postage meter machine. In a comparable way as warranted, further protocols are executed (steps 107, not shown in detail) to determine in the inquiry step 108 whether the chip card is readable as type n, in order to then branch to a corresponding step 109 for further data processing by the microprocessor 91 of the postage meter machine. Otherwise, when the type of the chip card is not recognized, a branch back to the step 101 ensues after an error message in the step 110.

Differing from U.S. Pat. No. 5,490,077, wherein the sequence is fixed and a chip card A for loading postage fee tables must be plugged in before a chip card B that, for example, sets a cost center, the inventive sequence for the sequential plugging of a series of chips cards internally initialized in the postage meter machine is arbitrary. Additionally, the type of chip card can be distinguished according to the inventive flowchart according to FIG. 4a. Advantageously, a suitable chip card type corresponding to the type of application is selected.

An expensive type of chip card only has to be employed in the special instances where there is no alternative.

There is no master card in U.S. Pat. No. 5,490,077, i.e. the chip cards are all technologically and functionally identical. An allocation of the five-place cost center number KST-No. to the function scope of the postage meter machine is only possible for the manufacturer. Differing therefrom, it is now inventively also possible for the user to store a free allocation of three places of the five-place KST number for at least one of the application functions internally in the postage meter machine.

A time window for the insertion of every chip card is an invariable, fixed time period in U.S. Pat. No. 5,490,077. Inventively, however, no time limit is now prescribed for the first insertion of the chip card. Advantageously, a timer value is loaded into an area of the non-volatile memories 94 or 95 of the postage meter machine in a type of application corresponding to the identifier string of the chip cards, this timer value being formed by a counter that defines a time window for a succeeding action that, for example, is implemented with a successor chip card.

When a branch is made from the inquiry step 103 to a step 111 in order to load a part I of the identifier string of the non-volatile memory 94 of the postage meter machine, with the microprocessor 91 of the postage meter machine undertaking an evaluation of the company identification number (company ID), a chip card of type a is utilized with which information for the further operation of the postage meter machine can be derived from a stored company identifier B. As warranted, the microprocessor 91 additionally checks the company identifier B in a known way for the presence of a valid company ID. Otherwise, an error message is output in the optional step 113. In the step 112, the company identifier B is stored in one of the non-volatile memory areas of the postage meter machine in order to then branch to a step 114.

In the step 114, a part II of the identifier string is loaded into the non-volatile memory 94 of the postage meter machine, with the microprocessor 91 of the postage meter machine undertaking a masking of the starting identifier A for the derivation of a first identifier A1 with which a computational operation is subsequently implemented for forming a second identifier A2, in order to subsequently check whether the first part I stemming from the identifier string and the identifier A2 have a predetermined relationship to one another. For forming a second identifier A2, a computational operation having the form $$A2=A1\text{-}SRN\text{-}C \quad (1)$$

ensues with the serial number SRN of the postage meter machine and with a secret constant C.

Using the company identifier B, the microprocessor 91 of the postage meter machine is to subsequently check:

$$\text{Identifier } B=A2 \quad (2).$$

Evaluating Equation (2), an inhibiting of the memory area in the postage meter machine ensues for predetermined applications in the step 116 when the predetermined relationship is lacking or—otherwise—, for example when the company identifier (company ID) is the same as the second identifier A2 that is formed, a branch is made to a step 117. A further masking of the identifier can now be undertaken in order to identify the master card.

A check to see whether a master card is present is carried out in the inquiry step 118. When this is the case, a branch is made to a step 120 in order to load a timer value into the non-volatile memory 94 of the postage meter machine, whereby the microprocessor 91 of the postage meter machine—in the step 121—enables the functionality that is provided in the program memory 92 of the postage meter machine for the master card. This functionality includes a generation of a specific functions application card with the postage meter machine, which is explained in greater detail below with reference to FIG. 5. A check is thereby carried out in the step 122 to determine whether the card is still plugged in. When this is the case, the functionality is enabled further. Otherwise, a timer is started in the step 123. For example, the timer is a backward (countdown) timer realized with memory cells in the volatile memory 93 or in one of the non-volatile memories 94, 95 of the postage meter machine, and the oscillator in the clock/date circuit 95 supplies a corresponding clock signal. A check to determine whether the end of the timer has been reached is carried out in the step 124. When this is not the case and a further chip card is plugged, then a branch is made back to the step 101 (point c). This loop to the point c makes it possible to continue the reloading independently of type after the insertion of a further chip card. At the end of the timer, for example when the count value zero is reached, an interrupt is triggered for the microprocessor 91 of the postage meter machine. In the following step 131, further use of the postage meter machine for at least the one functionality of franking is then inhibited.

When a determination is made in the inquiry step 118 that no master card is present, a branch is made to a step 119 in order to load the part III of the identifier string into the non-volatile memory 94 or 95 of the postage meter machine and in order to undertake an evaluation of the chip card number stemming therefrom. A number of different application functionalities is listed in the memory cells of a memory area of the non-volatile memory 94 or 95 of the postage meter machine, with a corresponding chip card number being allocated to every application functionality. When no application is stored in the list allocated to a specific chip card number, a branch is made from the inquiry step 125 to the following step 131 in order to inhibit the further use of the postage meter machine for at least the one functionality of franking. Otherwise, a timer is started in the step 129, and the listed functionality is enabled in the step 127 according to the chip card number if a check carried out in the step 128 determines that the card is no longer plugged-in. The timer makes it compulsory to continue reloading with another card. When the first card is still plugged-in, a branch back ensues and the functionality is enabled further. At the end of the timer, an interrupt is triggered for the microprocessor 91 of the postage meter machine and a branch is made to the following step 131. The aforementioned steps 111–119 and 125–130 are likewise executed given insertion of a successor chip card.

The identifier string has a key-like function. The identifier string is non-volatilely stored in the chip card distributed among a number of security areas, so that different security demands must be met for the modification of the part of the identifier string stored in the respective security area. Since the manufacturer has written the first and second parts of the identifier string, a user of the postage meter machine can write the third part of the identifier string with a chip card number. The microprocessor 91 is programmed to modify a chip card number stored in the chip card and to store an allocation of the chip card number to listed application functions in the non-volatile memory of the postage meter machine.

The microprocessor 91 of the control device 90 is programmed—in combination with chip cards suitably initialized for the respective application purpose—to simplify the function input and an application function, for example the administration of cost center data to be registered. The function input includes the top down initialization of further chip cards.

The chip card write/read unit 70 is composed of a mechanical carrier for the microprocessor card and a contacting arrangement 74. The latter allows a reliable mechanical holding of the chip card in the read position and unambiguous signaling of when the read position of the chip card in the contacting arrangement 74 is reached, for example a tactile signal by a pressure point according to the push/push principle, an eject key or a display beeper message of the postage meter machine. A reliable electrical contacting of chip cards with contacts according to ISO 7816 for at least 100,000 contacting cycles, as well as easy utilization when plugging and pulling the chip card are thus achieved. The microprocessor card with the microprocessor 75 has a programmed-in read capability for all types of memory cards, as well as for chip cards with and without PIN coding. An encryption or deciphering for security algorithms (for example, RSA, DES) is not required. The interface to the postage meter machine is a serial interface according to RS232 standard. The data transmission rate amounts to a minimum of 1.2 Baud. A self-test function with ready message can be manually implemented or can be automatically implemented after turning on the power supply with switch 71. The master card 50 inserted into the plug-in slot 72 grants at least an access authorization to the overall cost center, i.e. all issued master chip cards access only this cost center. After this, there is the possibility of selecting another cost center by keyboard. Among other things, master chip cards are provided for the inventive definition of the chip card/cost center relationship and for enabling/inhibiting cards. For expanding the function scope, an access possibility to defined cost centers via the successor cards can be created with the postage meter machine, whereby a storage of the allocation being possible according to an arbitrary hierarchy.

The data exchange between chip card and chip card write/read unit that, according to step 102, is implemented according to protocol when transmission ensues according to the master/slave method, as fundamentally disclosed in U.S. Pat. No. 5,490,077. In the solution therein, data are read out from the unprotected memory area, are communicated to the postage meter machine in the form of a tenth dataset and are loaded into its predetermined memory areas.

In the inventive solution for data exchange, protected data are additionally read out from the protected memory area of the chip card in the step 121 or 127, are communicated to the postage meter machine in the form of at least a further, twelfth dataset and are loaded into its memory areas.

In the method for data exchange between a postage meter machine and chip cards, the postage meter machine being equipped with a chip card write/read unit 70 for different types of chip cards and with a control system 1 for data loading or for data input by chip cards, the data exchange with datasets ensues under the control of the control system 1 on the basis of the specific protocol for each chip card type. A loading of a dataset ensues that includes the chip card number, and data from the specifically protected, non-volatile memory areas of the chip card are loaded into the memory areas of the control system 1 of the postage meter machine with an additional dataset. The additional dataset includes a base number BN and sequence number FN stored in the specifically protected, non-volatile memory areas of the chip card. This base number BN loaded into the postage meter machine is compared to a first code stored therein in order to modify an allocation of features/data stored in the postage meter machine to a second code that is subsequently entered. The implemented loading of the datasets from the memory areas of a first chip card 50 into the non-volatile memory areas of the control system 1 identifies an authorized person who, for example, is authorized to enter the second code into the postage meter machine by keyboard. The first chip card is thus a master card.

A list is produced in the non-volatile memory areas by the authorized person, for example the authorized user, with at least one of the application functions being allocated to the second code in the list.

As an alternative to the second code, the authorized person can enter a sequence number FN into the postage meter machine with a second chip card 49 that is likewise a reload (update) chip card. The sequence number FN loaded into the postage meter machine has a predetermined relationship to a base number BN subsequently loaded into the postage meter machine for a further reload chip card 49. Data are loaded from the reload chip card 49 subsequently inserted into the chip card write/read unit 70 of the postage meter machine when the base number BN has a predetermined relationship to the sequence number FN stored in the postage meter machine. The base number BN subsequently loaded into the postage meter machine corresponds to the second code. The authorized person can also enter this second code by keyboard.

Advantageously, access to all listed application functions as well as a reloading of cryptographic session keys, fee schedule tables and other reload data can be implemented with a multi-function chip card 50. Modifications of the fee schedule tables can be reloaded with further chips cards of the same or of a different type. This also enables an inexpensive solution with a further reload chip card 49 when a single chip card cannot completely contain all of the reload data due to limited memory capacity. A further reload chip card 49 also can enable an access to listed applications functions as well as a reloading of cryptographic session keys, fee schedule tables and other update data.

Figure 4B:
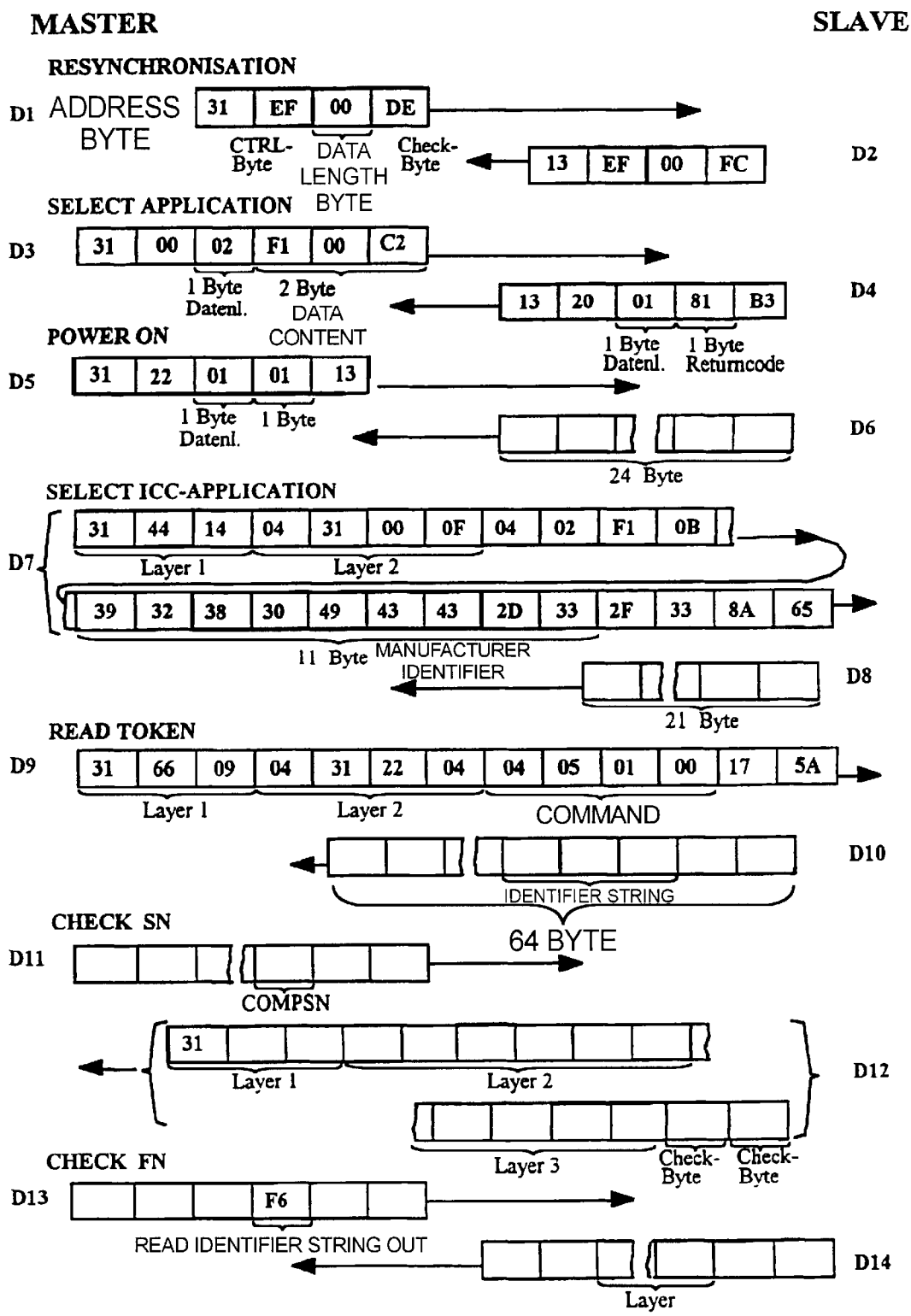
FIG. 4b illustrates data exchange between a chip card and the chip card write/read unit in accordance with the invention.

According to FIG. 4b, a data exchange ensues between the chip card write/read unit of the postage meter machine and the chip card, with the chip card write/read unit of the postage meter machine functioning as master, and providing a first dataset D1 as an output. The illustration of the first dataset D1 shows four fields for an address byte, a CTRL byte, a data length byte and a check byte. The chip card serves as slave and sends a second dataset D2 with the same structure back to the chip card write/read unit. The address byte and the check byte are correspondingly modified compared to the first dataset D1.

The address byte of the first dataset D1 and of all further datasets with an odd number identifies the device address of the SCP slave. The SCP (Standard Communication Protocol) is based on the ISO/OSI architecture model. The seven layers of the model are combined in three layers in the SCP: communication, transport and line layer. The baud rate and the frame for an asynchronous half-duplex transmission are defined in the line layer. The higher-ranking transport layer serves for the error-free and complete transport of the data to the respective address. The communication layer contains general control commands for the communication parties. The data exchange is explained on the basis of the transport layer. The control byte (CTRL byte) in the second field of the illustrated first and second dataset D1, D2 allows three command types and shows the RESYNC command EF here. The latter is sent when a new protocol is begun and serves for resetting the reception and transmission succession counter. In this case, the data length byte in the third field indicates the data length of zero since no data are being sent. The check byte is preferably the result of an XOR operation of the bytes of a dataset (transmission block). The third dataset D3 contains the SELECT APPLICATION command F1 in the fourth field. This command resets the SCP slave and selects an application protocol. A following data field (fifth field) contains the number of the selected application, 00 here as indicating a T=14 protocol of the line layer. The answer 81 in the fourth field of the fourth dataset D4 is a return code. The command 01 in the fourth field of the fifth dataset D2 signals that the voltage is switched on. The sixth dataset D6 contains a corresponding answer. The identifier of the card manufacturer is communicated in the seventh dataset D7 and a corresponding answer is communicated in the eighth dataset D8. The command READ TOKEN is communicated in the ninth dataset D9 for initiating the readout of the identifier string, and a corresponding answer with the identifier string is communicated in the tenth dataset D10. The input of the cost center number for the overall cost center by the chip card ensues, for example, by masking the identifier string or, respectively, with a specific calculating operation and effects an access authorization to the postage meter machine in an indirect way.

In addition, a user or the postage meter machine is authorized by a specific number or code in the chip card to additionally read especially protected data out from the protected memory area of the chip card. Inventively, an eleventh dataset D11 contains a specific number, preferably the serial number SN of the postage meter machine, and a sixth command COMPBN. The dataset D11 is communicated from the postage meter machine to the chip card via the chip card write/read unit. The sixth command COMPBN instructs the chip card to implement a comparison of the serial number SN stored in the chip card to the SN communicated in the eleventh dataset D11. The chip card contains at least 1 byte of the serial number SN of the postage meter machine that belongs to the user circle. The chip card thus checks whether it belongs to the user circle of the postage meter machine in that it compares parts of the serial number SN of the postage meter machine to the internally stored part of the serial number SN of the postage meter machine. The comparison result is communicated to the chip card/reader that (in the $1^{st}$ version) receives the following twelfth dataset D12 given a positive comparison result:

Byte/Layer/Comment About Content
1. ($1^{st}$ layer) byte with the mirrored address of the dataset D11,
2. ($1^{st}$ layer) control byte
3. ($1^{st}$ layer) data length byte
4. ($2^{nd}$ layer) control byte
5. ($2^{nd}$ layer) address byte
6. ($2^{nd}$ layer) data length byte
7. ($2^{nd}$ layer) control byte
8. ($2^{nd}$ layer) command byte
9. ($2^{nd}$ layer) data length byte for next layer,
10. ($3^{rd}$ layer) data byte with a unique number BN,
11. ($3^{rd}$ layer) data byte with a unique number FN
12. ($3^{rd}$ layer) data byte with an encrypted session key K1[$KEY_{n+1}$],
13. ($3^{rd}$ layer) data byte for reload data ND,
14. ($3^{rd}$ layer) data byte with a MAC for BN, FN and ND,
15. ($3^{rd}$ layer) check byte,
16. ($2^{nd}$ layer) check byte.

The twelfth dataset D12 received by the chip card/reader given a positive comparison result contains a unique base number BN as first code in order to modify and allocation for features/data stored in the postage meter machine to a second code that is subsequently input. The latter can be manually entered by keyboard when initializing a successor card, or can be the function called a subsequently inserted second chip card 49.

This base number BN is entered into the postage meter machine with the current master chip card. Given a negative comparison result, i.e. comparison of the stored to the communicated specific number or code, another unique base number BN is communicated onto a predetermined value. However, access to a specific memory area of the postage meter machine thus cannot be achieved and specific functions cannot be called because the corresponding allocation in the postage meter machine likewise does not exist. For example, a debiting and franking is made impossible in an indirect way without blocking the other functions of the postage meter machine.

Moreover, the correctness of the sequence can be checked in the postage meter machine in that the sequence number $FN_n$ loaded from the previous chip card is converted into a sequence number $FN_{n+1}$ and is stored. It can then be compared to a currently loaded sequence number $FN_{n+1}$. When the sequence number $FN_{n+1}$ communicated in the twelfth dataset D12 corresponds to just such a sequence number $FN_{n+1}$ stored in the postage meter machine, then the chip card is a successor card inserted in the correct sequence. Alternatively, an electronic pointer points to one of the listed sequence numbers corresponding to the loaded sequence number. Subsequently, the pointer setting is modified and the pointer points to the next sequence number that is expected corresponding to the sequence at the next reloading. The pointer is realized as a forward/backward counter and the pointer setting is modified by forward/backward counting and is realized in the memory cells of the non-volatile memory of the postage meter machine.

Inventively, the communicated data BN, FN and ND are protected by a message authentification code (MAC). After the data exchange between the OTP processor in the security module of the postage meter machine and the chip card/reader, the OTP processor (One Time Programmable) of the postage meter machine processes the dataset D12 in that it encrypts the communicated data BN, FN to a reference MAC with a secret key. A first current secret key K1 is encrypted to Kb[K1] and is stored in the non-volatile memory (NVRAM) of the postage meter machine at the start in the initialization. The latter can be deciphered in the OTP processor with a DES (Data Encryption Standard) algorithm stored in the internal OTP-ROM and secret basic key Kb. The first current secret key K1 is used for encrypting the predetermined base number BN and succession number FN to form the reference MAC, whereby the operation occurs exclusively internally in the OTP and can thus not be read out. The authentification of the communicated data BN, FN, ND in the postage meter machine ensues by comparing the communicated MAC to the reference MAC. The comparison thereby preferably ensues before the aforementioned, separate interpretation of the communicated data BN, FN.

The communicated data also include an encrypted session key K1[$KEY_{n+1}$]. No such secret data like the secret basic key Kb are thus also stored in the chip card, but instead an encrypted session key K1[$KEY_{n+1}$] is stored. When the authentification was successful, the latter is likewise stored encrypted in the NVRAM of the postage meter machine as a crypto key. The encrypted session key K1[$KEY_{n+1}$] is first deciphered to the session key $KEY_{n+1}$, whereby the first current secret key K1 is applied to the DES algorithm. The unencrypted key $KEY_{n+1}$ is then encrypted in the OTP processor to form Kb[$KEY_{n+1}$], whereby the secret basic key Kb is applied to the DES algorithm, and thus forms the basis for utilization as the next current secret session key by deciphering the crypto key Kb[$KEY_{n+1}$] stored in the NVRAM. The session key $KEY_{n+1}$ can be versatilely employed. For example, it can be required in order to replenish or renew or allocate service features or data, which must be separately paid for, with further chip cards.

As noted above, the first inserted chip card is also referred to as the master chip card 50. After its authorization, for example, service features are also enabled. It may be necessary to form a combination of service features already loaded and a service feature yet to be loaded. Manual inputs must then be made for the service feature to be loaded or a further chip card 49 with the service feature to be loaded must be inserted into the slot after the master chip card 50 has been removed.

To this end, a further chip 49 is plugged-in that is provided with a corresponding external identification for the user. Further datasets are exchanged and, after the reception of the twelfth dataset D12 and the aforementioned authorization and interpretation of the communicated data, a thirteenth dataset D13 is communicated from the postage meter machine with the chip card/reader to the chip card, the dataset D13 including the succession number $FN_{n+1}$ that has been entered with the predecessor chip card 50. Whenever the base number $BN_{n+1}$ stored in a further chip card 49 has a specific relationship to the succession number $FN_{n+1}$ that was input into the postage meter machine with a predecessor chip card (that had the base number $BN_n$), then the correct sequence of insertion and a valid, further chip card have been employed. Which base number is expected thus is also communicated to the successor card in this way. After a procedure (master/slave procedure) whereby a command CHECK FN is forwarded (in the dataset D13) from the chip card/reader to the chip card, the chip card replies with a fourteenth dataset D14 that contains further requested data from protected memory areas of the chip card.

Otherwise, when the succession number $FN_{n+1}$ sent from the postage meter machine to the chip card has no specific relationship to the base number $BN_{n+1}$ of the inserted chip card, an instruction that the chip card corresponding to the succession number $FN_{n+1}$ should be inserted is displayed in the display of the postage meter machine as an evaluation of the fourteenth dataset D14.

The manner for replenishing or renewing further features which must be separately paid for, for example number of items or time limit, with further chip cards is shown in another embodiment. The succession number is again required for this purpose. After a first exchange of a number of datasets and a subsequent serial number comparison in the chip card, the result of the comparison is communicated to the chip card/reader, which then receives the following, twelfth dataset D12 given a positive comparison result:
Byte/Layer/Comment About the Content
1. ($1^{st}$ layer) byte with the mirrored address of the eleventh dataset D11,
2. ($1^{st}$ layer) control byte,
3. ($1^{st}$ layer) date length byte,
4. ($2^{nd}$ layer) control byte,
5. ($2^{nd}$ layer) address byte,
6. ($2^{nd}$ layer) data length byte
7. ($2^{nd}$ layer) control byte,
8. ($2^{nd}$ layer) command byte,
9. ($2^{nd}$ layer) data length byte for next layer,
10. ($3^{rd}$ layer) data byte given positive comparison result (P),
11. ($3^{rd}$ layer) data byte with a unique number BN,
12. ($3^{rd}$ layer) data byte with a unique number FN,
13. ($3^{rd}$ layer) data byte with an encrypted session key K1[$KEY_{n+1}$]
14. ($3^{rd}$ layer) data byte with prescribed number of items VGS for frankings,
15. ($3^{rd}$ layer) data byte with a time limit TL for features of the postage meter machine,
16. ($3^{rd}$ layer) data byte for reload data ND,
17. ($3^{rd}$ layer) data byte for reload data ND,
18. ($3^{rd}$ layer) data byte for reload data ND,
19. ($3^{rd}$ layer) data byte with a MAC for (P), FN, VGS, TL and ND,
20. ($3^{rd}$ layer) check byte,
21. ($2^{nd}$ layer) check byte.

The fourteenth and fifteenth bytes are provided for additional tasks but are not compulsory. Further bytes, for example the sixteenth through eighteenth byte, are provided for reload data ND. The authorization of the numbers BN, FN, prescribed data VGS, TL or reload data ND again ensues in the postage meter machine on the basis of the appertaining MAC. The tenth byte for P or N (positive or negative comparison result) is thus for internal use and need not necessarily be transmitted. Given a negative comparison result N, an invalid base number BN, succession number FN or settings having the value zero is communicated in the twelfth dataset D12.

Given a positive comparison result P, the twelfth dataset D12 received by the chip card/reader contains a unique base number BN as first code in order to modify an allocation of features/data stored in the postage meter machine to a second code that is entered manually or by a subsequently inserted, second chip card 49. Additionally, the allocation is limited by a prescribed number of items VGS for frankings and must be renewed when the limit has been reached (number of items sleeping mode for chip card). A separate limitation of the number of items for frankings is preferably provided in the postage meter machine for each cost center KST. This creates an additional security protection when accounting is carried out department-by-department that one department (KST) at the limit does not impede all other departments (KSTs) from franking. Other cost centers KST thus can continue to frank or use the performance features that do not belong to franking. Inventively, a number of items limit is predetermined for every mail class PK (postage value). For example, the prescribed item number $VGS_{PK1}$ is provided for franking of a mail class PK1 for postage values [of] 1 DM. By timely insertion of another chip card that has been sent, the item number limit can be newly entered for a KST and/or an individual mail class PK (postage value) (without debiting because the chip card is prepaid at the meter leasing or selling company).

Inventively, a time limit TL for all features of the postage meter machine is prescribed for every function that is reached with the unique number BN.

Inventively, at least some or all settings (entries) BN, FN, VGS and TL as well as reload (update) data ND are protected by a MAC (Message Authentification Code). The OTP(One Time Programmable) processor of the postage meter machine processes, for example, the dataset D12 after data exchange between the OTP processor (in the security module) of the postage meter machine and the chip card/reader in that it encrypts all prescriptions BN, FN, VGS and TL as well as reload data ND to a reference MAC with a secret key. The principle of cumulative MAC formation (with DES algorithm and cipher block chaining method) can be employed in order to authenticate an arbitrarily large number of bytes protected in this way. Input values that are 8 bytes long are encrypted with the DES (Data Encryption Standard) and the 8-byte long output values are XOR operated with 8-byte long, second input values and are then again encrypted with the DES, etc.

A secret key and the DES algorithm is again stored in the OTP-ROM in order to form the reference MAC in the above way. In order to check the authenticity of all settings BN, FN, VGS and TL as well as reload data, the reference MAC internally formed in the OTP and the MAC communicated to the OTP are compared. Given coincidence, the settings BN, FN, VGS and TL as well as reload data ND are non-volatilely stored in the non-volatile memory together with the MAC.

Before every franking, the OTP processor of the postage meter machine checks the transgression of the item number limit set by VGS according to the cost center KST that has been set. The invention allows replenishing or renewing the item number limit with further chip cards, which must be separately paid for.

Also, before every use of a feature, the OTP processor checks the transgression of the time limit set by TL according to the cost center KST that has been set. The invention also allows replenishing or renewing the time limit for individual features with further chip cards, which must be separately paid for.

Subsequently, for example, the features are enabled. It may be necessary to form a combination of features already loaded and features yet to be loaded. Manual entries are then made for the feature to be loaded or a further chip card 49 with the service features to be loaded must be inserted into the slot after the master chip card 50 has been removed.

After a procedure (master/slave procedure) whereby a command CHECK FN is forwarded (in the dataset D13) to the chip card/reader from the FM, the chip card/reader replies with a fourteenth dataset D14 that, among other things, contains the requested data (service feature and/or code) from the chip card.

The succession number FN is required in order to replenish or renew the item number or time limit with further chip cards, which must be separately paid for. Whenever the base number BN stored in the chip card has a predetermined relationship with the succession number FN that was entered into the postage meter machine with a predecessor card, then VGS or TL is correspondingly replenished (add) or renewed (fill up) to the value of VGS or TL. The chip card then sends a corresponding fourteenth dataset to the postage meter machine.

Each postage meter machine with chip card reader is delivered with at least one type c master card. The second and further supplied cards are type a successor cards. Each chip card has a running chip card number that is an unambiguous identifier for each chip card, i.e. the chip cards are not yet allocated to specific postage meter machines in the personalized condition. The new postage meter machine to be placed in operation will automatically validate the first inserted chip card as its unique master card and stores a corresponding chip card number in its memories. The allocation of the functionality of every existing or subsequently supplied card ensues internally in the postage meter machine via a table. The functionality of the master card is defined as follows:

a) The cost center KST 1 is selected as a pre-setting; this pre-set value can be modified.

b) It is manually possible to establish, delete and select cost centers KST.

c) It is possible to allocate successor cards to specific cost centers KST, to modify or delete allocations.

d) All available linkage conditions are definable. This also relates to the allocation of limit data to successor cards or, respectively, the table is to be correspondingly filled with input data.

e) Access to the full functionality of the postage meter machine.

The functionality of the successor card is defined as follows:

a) Automatic selection of a defined cost center KST or KST group with the linkage conditions thereof (advertizing slogan No., potentially with value limitation per time unit, etc.).

b) Set, modify or delete cost center/advertizing slogan allocations. Free selection of all slogans present in the postage meter machine.

c) "Duplicate successor cards" function.

The security with respect to protection against card copying is assured by manufacturer-specific and user-specific information in a write-protected area of the card. At the manufacturer side, the chip cards are provided with an FP-specific identifier B in the write-protected part I of the identifier string. Additionally, the identifier A is stored write-protected on the part of the postage meter machine upon initial authorization, this identifier A being composed of the serial number of the postage meter machine and of an appended, for example 3-place consecutive number 505010 001. A distinction is made between master card and successor cards, but the difference is only comprised therein that the master card is the first card authorized by the postage meter machine; otherwise, the structure of the card content is identical.

The postage meter machine JetMail® is able to automatically authorize chip cards for use at it. This occurs proceeding from a cost center menu sub-point provided for that purpose. After insertion of the master card and selection of the authorization function, an arbitrary successor card is allocated to an existing or newly defined cost center or group. To this end, the corresponding successor card is plugged-in and is written with an identifier A by the postage meter machine. When the chip card is used, both identifiers (A and B) are loaded from the chip card into the postage meter machine and are compared to one another therein after a computational operation. Given, for example, equality, the interpretation of the blanked-out, last three places of the identifier A ensues via a table with respect, among other things, to which cost center number this card is allocated. The first entry in the table ensues for the master card. The postage meter machine is blocked without an inserted master card exhibiting the authorization function.

For example, the following table is present in the postage meter machine for the first branch according to FIG. 1*b*:

| Card No. | KST No. | Timer value | Advertizing slogan | Function Limit | Value limit | Actual remaining value |
|---|---|---|---|---|---|---|
| 1234567801 | 1-50 | 20 sec | no | all/5000 | R3.x = 5000.-- | R1.x = 99.-- |
| 1234567802 | 1-4 | 10 sec | 1 | F1/2000 | R3.y = 2000.-- | R1.y = 255.-- |
| 1234567803 | 1 | 2 sec | 1 | F3/2000 | R3.1 = 1000.-- | R1.1 = 99.-- |
| 1234567804 | 3 | 2 sec | no | F4/2000 | R3.3 = 1000.-- | R1.3 = 10.-- |
| 1234567805 | 4 | 2 sec | 5 | F5/3500 | R3.4 = 3000.-- | R1.4 = 2005.-- |
| 1234567806 | 2 | 1 sec | no | F6/6000 | R3.2 = 0.-- | R1.2 = 0.-- |

The customer has the possibility of labeling the type a chip card with the current cost center number. Modifications of allocations between chip cards and cost center numbers are only possible via the master card. Certain menu points in the cost center menu thus only enabled with inserted master card. Further, certain linkage conditions for the cost centers are analogously variable, for example with respect to advertizing slogan number, value limit per time unit. The postage meter machine reacts to inequality or, respectively, unknown, invalid cards with a corresponding error message. As a result of the "duplicate successor cards" function, the postage meter machine JetMail® continues to be enabled—with the assistance of the master card—to independently authorize successor cards for use at it. To that end, the corresponding successor card is inserted and written with the identifier A by the postage meter machine. A value limit for the usage of franking values per calendar month whose validity is limited in time (monthly) but renewable can be defined for each cost center KST with the assistance of the master card. The entire credit present in the postage meter machine JetMail®) is maximally available for every cost center KST. At the beginning of a new calendar month, the predetermined value limit is transferred; there are no carry-overs. Changes of allocations between chip card number and KST number functions with limit data as well as the value limitations are possible only with the assistance of the master card. The user interface of the postage meter machine is completely present at all times but, given selection of the points reserved for the master card when the master card is not inserted, this is required as authorization. The displayable table for the administration of the chip card functionality can, for example, contain the fields: chip card number/KST number/timer value/advertizing slogan allocation/value limit/current remaining value. For so-called group cards, it is possible that groups of cost centers x, y are allocated to a single card number. The control device 90 of the postage meter machine connected to the chip card write/read unit 70 has a non-volatile memories 94, 95 (the clock/date module, in this context, serving as a non-volatile memory for time data) with inventive memory areas A, B, C for an allocation of listed application functions with limit data to a predetermined chip card and for parameters. This display of the allocation can ensue according to the aforementioned table or in a similar form.

For data exchange between a postage meter machine and chip cards, whereby the postage meter machine is equipped with a chip card write/read unit 70 and appertaining control system 1, in accordance with the invention a microprocessor 85, 91 of the control system 1 is connected to the chip card write/read unit 70 and to a non-volatile memory with memory areas A, B for an allocation of listed application with limit data to a predetermined chip card and with a memory area C for parameters. The microprocessor 85, 91 is programmed, first, in order to reload (update) data, whereby a sequence for the insertion of the chip card into the chip card write/read unit determined by a succession number is required for valid chip cards 50, 49, and, second, to allow an authorized user to define a specific sequence for the insertion of lower-ranking, suitably initialized chip card in order to simplify the function and data input into the postage meter machine.

In one embodiment, the microprocessor 91 of the control device is programmed a) to load the chip card number stored in the respective chip card 50, 51, 52, 53;

b) to load the limit data belonging to a function stored in the first chip card 50, whereby the limit data belong to a function that can be called by a further chip card;

c) to store the allocation of limit data belonging to a function in the aforementioned memory areas A, B allocated to further chip card numbers, whereby the allocation to the chip card number can be stored in said memory areas A, B arbitrarily selectable by the authorized user for the following call by further chip cards with its number; and d) to call an allocation of the listed application functions with limit data to the respective chip card number in one of the memory areas A, B of the non-volatile memory 94, 95 of the postage meter machine and to implement the corresponding application programs stored in the program memory 92.

The microprocessor 91 of the control device 90 also is programmed to load the limit data stored in the first chip card 50 into a memory area C of the non-volatile memory 94, 95 of the postage meter machine as a parameter.

Figure 5A:
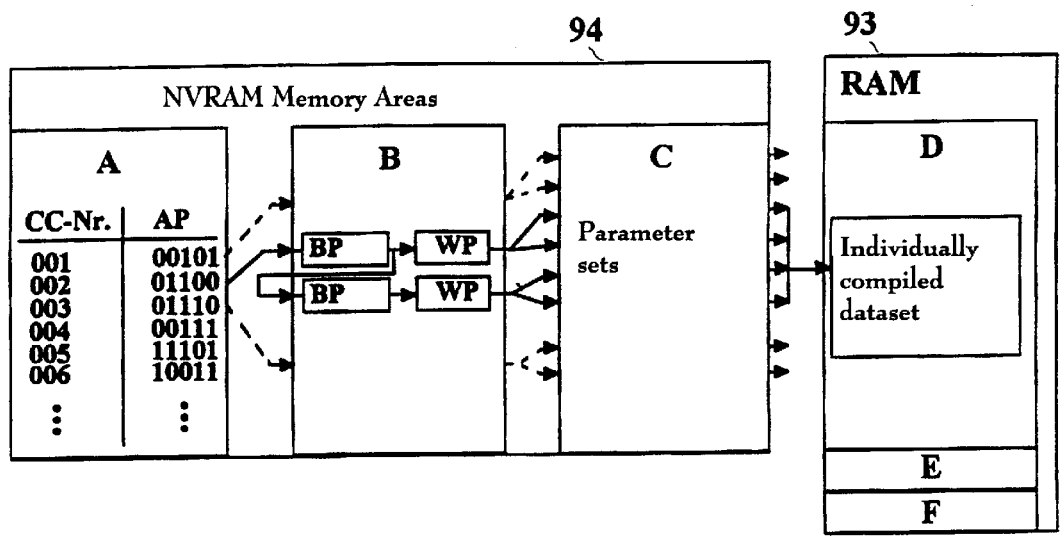
FIG. 5a illustrates the division of the structure onto memory areas in accordance with the invention.

FIG. 5a shows a division of the structure onto memory areas A, B and C, whereby a list of valid card numbers is non-volatilely stored in the first memory area A, linkage conditions are non-volatilely stored in the second memory area B and appertaining parameter sets are non-volatilely stored in the third memory area C. This structure can be separately modified in each of the aforementioned memory areas A and B. For example, a further card number is newly added to the listing in the list of valid card numbers CC-No. Each card number has an address pointer AP allocated to it that points to an address in the second memory area B under which the card number-dependent linkage conditions are stored together with appertaining condition pointers BP and value pointers WP. The value pointers WP point to an address for the appertaining parameter set in the third memory area C. A linkage is freely selectable via the condition pointers BP that point to an address for a further condition with the appertaining value pointer. The value pointer WP then points to an address with the appertaining parameter set in the third memory area C.

The divided (distributed), modifiable structure can be restored via the pointers. For this purpose the loaded pointers are intermediately stored in memory areas E, F of the main memory RAM 93, a corresponding data entry into a memory area D of the main memory RAM 93 is undertaken for storing a dataset, the microprocessor 91 of the postage meter machine executes a corresponding function or a stored sequence of functions according to the application program, and the parameters thus entered. One of the functions can be implemented for the initialization of successor cards in order to be able to modify these or in order to at least partially display the structure in a table.

It is assumed according to FIG. 4a that a part III of the identifier string is interpreted and that a determination is then made in step 125 that the function application is listed in that the card number is found in the memory area A. A timer value is now loaded into a further memory area U (not shown in FIG. 5a) of a non-volatile memory, preferably a memory area of the clock/date module 95. The step 127 is then reached.

Figure 5B:
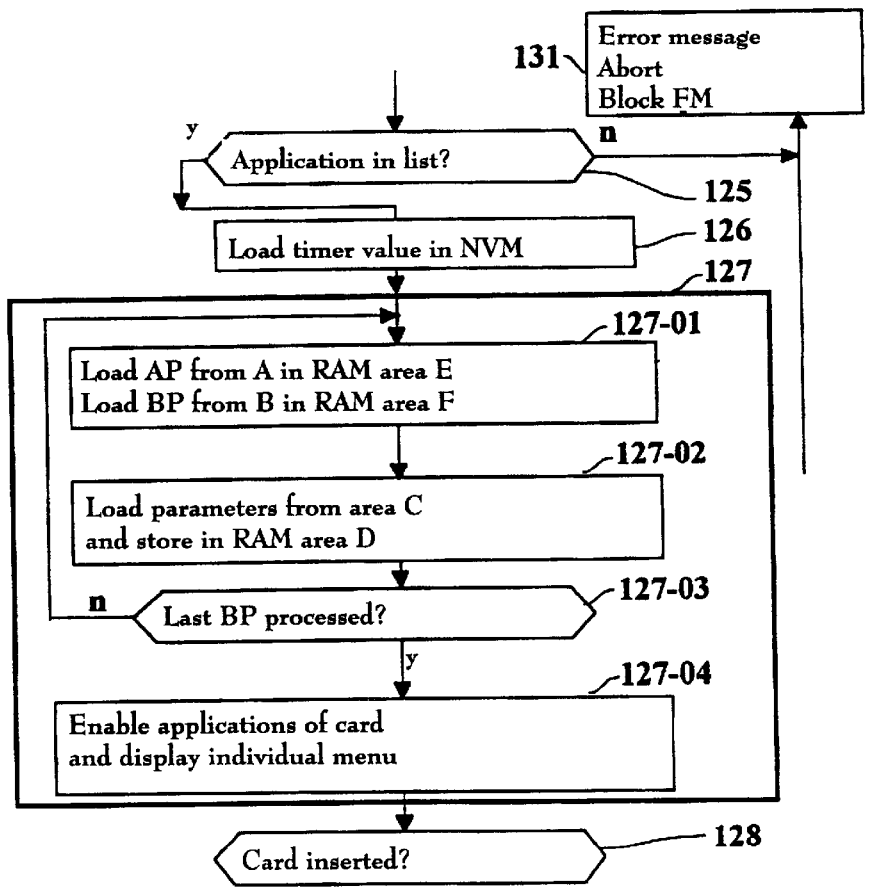
FIG. 5b is a flowchart for control by the microprocessor given the call of at least one of the functions according to the stored structure by entry of a chip card number in accordance with the invention.

FIG. 5b shows a detail of the flowchart of FIG. 4a in order to illustrate the control by the microprocessor 91 when calling at least one of the functions according to the stored structure by inputting a chip card number. Before the functionality is enabled for a successor card, that address pointer AP that is allocated in memory area A to the chip card number is loaded into a memory area E of the main memory RAM 93 in a sub-step 127-01. In the sub-step 127-01, moreover, condition pointers BP are loaded step-by-step into a memory area F of the main memory RAM 93 for every pass through a loop S. The memory areas E and F of the main memory RAM 93 serve for the intermediate storage of the data of the pointers AP and BP for the following data processing. After the loading and intermediate storage of the data of the pointers AP and BP, a value pointer WP stored in the second memory area B is found, this being allocated to the condition pointer BP. At the same time a following condition pointer BP that the microprocessor 91 should access in order to find further, appertaining value pointers WP is identified from the data of the condition pointer BP. The further data processing in the sub-step 127-02 is preferably nested, i.e. time-optimally organized. The technique known as "pipelining" can be implemented when the value pointers WP point to the parameter sets in the third memory area C and corresponding parameter sets are loaded from the third memory area C for storage in the RAM area D of the main memory RAM 93. A check is carried out in the following sub-step 127-03 to determine whether a last condition pointer BP had been processed in the aforementioned processing of the routine. When this is not the case, a branch is made back to the sub-step 127-01 in order to again sequentially process the loop S until the processing of a last condition pointer BP has been determined in the sub-step 127-03. In the following sub-step 127-04, the applications of the inserted card are enabled according to the dataset in the memory area D individually compiled during the processing of the loop S. The microprocessor 91 has recourse to function applications stored in the program memory 92 and to the parameters that are present in the intermediately stored dataset. At the same time, an individual menu corresponding to the individual dataset can be displayed in the display unit 89.

A function application stored in the program memory 92 provides a keyboard input so that the microprocessor 91 can complete the processing of the application program. The microprocessor 91 is programmed to access three memory areas A, B, C of the non-volatile memory 94, 95 of the control device 90 in order to call an allocation of the listed application functions to the respective chip card number in the non-volatile memory 94, 95 of the postage meter machine and implement the corresponding application programs. The allocation represents a predetermined structure, whereby the modifiable structure divided onto the three memory areas A, B, C of the non-volatile memory 94, 95 can be restored with pointers. The allocation of the listed application functions to the respective chip card number in one of the memory areas A, B of the non-volatile memory 94, 95 of the postage meter machine, that is called by the microprocessor 91 in order to implement the corresponding application programs stored in the program memory 92, can be arbitrarily modified with an inserted master card because the allocation can be stored arbitrarily selectable in said memory areas A, B by the authorized user according to at least one corresponding input, for example by keyboard 88.

The structure present stored in the non-volatile memory 94, 95 of the postage meter machine is a hierarchic structure established by the sequence of the listing of the chip card numbers and by the allocation of listed application functions.

The microprocessor 91 of the control device 90 is programmed to load the chip card number that is present stored in a part provided therefor in an identifier string stored in the protected memory areas of the chip cards 50, 51, 52, 53, to correspondingly implement a function input after the plugging of the chip card in order to simplify the administration of cost center data to be managed by accessing the appertaining function application program.

The programmability of the applications that are allocated to a chip card number explained with reference to the example of step 127 applies to first chip cards (master cards) in step 121 as well as to second and further successor cards.

For master cards 50, a branch when processing a corresponding step 121-04 can be made to a screen image for a menu point, "generate an application card" (step 121-1, not shown).

A group card GC is a second card that is authorized to a higher level than a further chip card EC or successor card FC (FIG. 1*b*). These latter cards EC and FC form group members on different hierarchy levels 52 and 53. The authorization protection within a group application, i.e. applications in a hierarchy level 52 or 53, also can be advantageously adapted to very different demands made of the individual security of the group members. This is achieved by maintaining a limit account in the postage meter machine for every chip card EC or FC unambiguously identifiable by the microprocessor on the basis of the hierarchically structured identifier string. The group card GC (ranking hierarchically higher) has previously loaded the limit account into protected memory areas of the non-volatile memory 94, 95 upon initialization of the hierarchically lower ranking chip card EC or FC. For example, the limit account is a time account that contains the following characteristic quantities:

repeated use within a time range Z1, maximally allowed usage spacing amounts to time span Z2, maximum use duration/session amounts to time span Z3, maximum lifetime amounts to time span Z4, the application extension time amounts to time span Z5.

As a result of such parameters (time account data), authorizations and limitations up to an expiration date at which the application is blocked can be granted to every chip card type. Only the chip card that granted authorizations and limitations can block or renew the grant. Inventively, the higher-ranking chip card (group card) granting an authorization/limitation can individually renew or extend the authorization for lower ranking chip cards EC or FC.

The microprocessor 91 of the postage meter machine sends a dataset to the first chip card 50 via the microprocessor 75 of the chip card write/read unit 70 in order to initiate the loading of the limit data belonging to a function. At least the first chip card 50 is a processor chip card realized with a read-only memory ROM for a general memory area, with a non-volatile write/read memory EEPROM that has an unprotected memory area CC1 and a protected memory area CC2, with a specific security protection and protection logic. A PIN check is implemented first before security-relevant data in the protected memory area CC2 are accessed. Security-relevant data, which represent limit data in terms of time, piece count or value or contain functions that effect a limitation of an operation, are stored in the protected memory area CC2 of the first chip card 50 together with the one part of the chip card number, and the limit data stored in the first chip card 50 are stored affiliated with a function.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for exchanging data between a postage meter machine and a chip card, comprising the steps of:

providing a postage meter machine with a chip card write/read unit and a non-volatile memory;

providing a set of chip cards which are individually insertable into said chip card write/read unit, said chip cards being of different chip card types and each having a chip card number, said set of chip cards including a first chip card and a second chip card and a plurality of further chip cards;

storing data in each of said chip cards in a dataset containing the data and the chip card number, for use in operating said postage meter machine;

providing a protected memory area in said first chip card and storing protected data in said protected memory area;

providing a control system in said postage meter machine which exchanges data with one of said chip cards in said set of chip cards inserted, as an inserted chip card, in said chip card write/read unit;

storing a plurality of data exchange protocols, respectively for said different chip card types, in said control system and selecting one of said protocols for data exchange with the inserted chip card dependent on the chip card type of the inserted chip card;

when said first chip card is inserted in said chip card write/read unit, loading said protected data into said non-volatile memory;

requiring adherence to a manufacturer-specified sequence for insertion of said first chip card and said second chip card in said chip card write/read unit; and allowing insertion of said further chip cards in a selectable sequence defined by a user of said postage meter machine.

2. A method as claimed in claim 1 wherein the step of storing protected data in said protected memory area of said first chip card comprises storing a base number and a succession number as said protected data in said protected memory area, and said method comprising the additional steps of:

storing a first code in said control system of said postage meter machine;

upon loading of said protected data into said non-volatile memory when said first chip card is inserted in said chip card write/read unit, comparing said base number to said first code;

subsequently entering a second code into said control system of said postage meter machine to which at least one of operational features and data stored in said control system can be allocated; and allowing modification of the allocation of said at least one of said operational features and data to said second code only given agreement between said base number and said first code.

3. A method as claimed in claim 2 wherein the step of loading said protected data into said non-volatile memory identifies an authorized user of said postage meter machine, and wherein said second code includes an identification of a user entering said second code, and comprising the additional steps of allowing said modification of the allocation of at least one of said operational features and data only if the user identified in said second code agrees with said authorized user; and producing a list in said non-volatile memory of the allocation to said second code of said at least one of said operational features and data.

4. A method as claimed in claim 2 wherein the step of entering said second code comprises providing a keyboard in communication with said control system and entering said second code via said keyboard.

5. A method as claimed in claim 2 wherein the step of entering said second code comprises storing said second code in said second chip card and inserting said second chip card in said chip card write/read unit.

6. A method as claimed in claim 1 wherein the step of storing protected data in said protected memory area of said first chip card includes storing a base number and a succession number, as said protected data, in said protected memory area of said first chip card, and wherein the step of storing data in each of said chip cards includes storing a base number and update data in said second chip card, and comprising the additional step of allowing loading of said update data into said control system, upon insertion of said second chip card into said chip card write/read unit, only if said base number of said second chip card has a predetermined relationship to said succession number loaded from said first chip card.

7. A method as claimed in claim 1 wherein the step of storing protected data in said protected memory area of said first chip card comprises storing a part of the chip card number of said first chip card in said protected memory area together with security data relevant to said further chip cards selected from the group consisting of a validity time limit, an item limit number, a monetary value limit, and limitations on functions executed by control system to operate said postage meter machine.

8. A method as claimed in claim 1 wherein the step of storing data in each of said chip cards comprises storing a succession number in each of said chip cards, and said method comprising the additional steps of:

for each of said further chip cards inserted in said chip card write/read unit, as an inserted further chip card, loading the succession number stored in the inserted further chip card as a stored succession number;

converting the stored succession number into a subsequent succession number which follows said stored succession number in said selected sequence defined by said user of said postage meter machine;

upon removal of said inserted further chip card and insertion of another one of said further chip cards in said chip card write/read unit, as a subsequently inserted further chip card, comparing the succession number of said subsequently inserted further chip card to the subsequent succession number and allowing operation of said postage meter machine with said subsequently inserted further chip card only upon agreement of said succession number stored in said successively inserted further chip card with said subsequent succession number.

9. A method as claimed in claim 1 comprising the additional steps of:

storing a serial number, uniquely identifying said postage meter machine, in said non-volatile memory;

storing said serial number at said manufacturer in said first chip card;

wherein the step of storing said protected data in said protected memory area of said first chip card comprises storing said protected data in said protected memory area protected by an authorization code; and when said first chip card is inserted in said chip card write/read unit, comparing the serial number stored in said first chip card to said serial number stored in said non-volatile memory and, only upon agreement between said serial number stored in said first chip card and said serial number stored in said non-volatile memory, loading said authorization code into said control system and using said authorization code to make use of said protected data for operating said postage meter machine.

10. A postal apparatus comprising:

a postage meter machine having a chip card write/read unit and a non-volatile memory;

a set of chip cards, individually insertable into said chip card write/read unit, each of said chip cards having a chip card number and said set of chip cards including a first chip card, a second chip card and a plurality of further chip cards, each of said chip cards having data stored therein for use in operating said postage meter machine, said data being stored in a dataset with the chip card number;

said postage meter machine including a microprocessor in communication with said chip card write/read unit, said microprocessor, via said chip card write/read unit, exchanging data with said chip cards as said chip cards are respectively inserted in said chip card write/read unit, as an inserted chip card;

said microprocessor requiring insertion of said first chip card and said second chip card in a predetermined, manufacturer-specified sequence; and a user interface allowing a user to enter instructions for said microprocessor, in order to select a sequence for insertion of the respective further chip cards.

11. A postal apparatus as claimed in claim 10 wherein said non-volatile memory contains non-volatile memory areas into which said data stored in the respective chip cards is loaded, upon respective insertion of said chip cards in said chip card write/read unit, allocated to the respective chip card numbers in an allocation structure.

12. A postal apparatus as claimed in claim 11 wherein said microprocessor comprises means for organizing said allocation structure into a hierarchic structure established by a sequence of said chip card numbers.

13. A postal apparatus as claimed in claim 10 wherein each of said chip cards has a succession number stored therein, and wherein said microprocessor requires insertion of said chip cards in a sequence determined by the respective succession number.

14. A postal apparatus as claimed in claim 10 wherein said first chip card has a protected memory area in which limit data are stored, and wherein said limit data are loaded into an area of said non-volatile memory upon insertion of said first chip card in said chip card write/read unit, and wherein said data stored in said further chip cards and loaded into said non-volatile memory are employed for performing a plurality of respective functions by said postage meter machine, and wherein said microprocessor uses said limit data to limit at least one of said functions.

15. A postal apparatus as claimed in claim 10 wherein said chip cards have a hierarchical ranking from a highest ranking chip card, comprising said first chip card, to a lowest ranking chip card, and wherein said microprocessor allows modification of said allocation structure only with authorization for performing a function corresponding to the data stored in a lower ranking chip card by a higher ranking chip card.

16. A postal apparatus as claimed in claim 10 wherein at least one of said chip cards comprises an update chip card containing a session key encrypted with a first secret key, said session key also being stored in said non-volatile memory in a form encrypted with a secret basic key.

17. A postal apparatus as claimed in claim 16 wherein said microprocessor deciphers said session key using said first secret key and stores said session key in said non-volatile memory encrypted with said secret basic key.

* * * * *